(12) United States Patent
Ball

(10) Patent No.: US 6,327,378 B1
(45) Date of Patent: Dec. 4, 2001

(54) CHARACTER RECOGNITION METHOD

(75) Inventor: Stuart R. Ball, Yukon, OK (US)

(73) Assignee: BancTec, Inc., Dallas, TX (US)

( * ) Notice: Subject to any disclaimer, the term of this patent is extended or adjusted under 35 U.S.C. 154(b) by 0 days.

(21) Appl. No.: 08/389,096

(22) Filed: Feb. 15, 1995

(51) Int. Cl.$^7$ .............................. G06K 9/00; G06K 9/46; G06K 9/20; G06K 7/08

(52) U.S. Cl. .......................... 382/137; 382/207; 382/320; 235/449

(58) Field of Search .................................... 382/137, 139, 382/140, 207, 208, 312, 320, 321, 323; 235/449, 450

(56) References Cited

U.S. PATENT DOCUMENTS

| | | | |
|---|---|---|---|
| 3,114,131 | 12/1963 | Furr et al. | 382/182 |
| 3,264,609 | 8/1966 | Scheidhauer | 382/139 |
| 3,391,387 | 7/1968 | Flores | 382/139 |
| 3,439,337 | 4/1969 | Trimble | 382/208 |
| 3,528,058 | 9/1970 | Bond | 392/207 |
| 3,571,793 | * 3/1971 | Britt | 382/139 |
| 3,629,829 | 12/1971 | Ordower | 382/139 |
| 3,638,238 | 1/1972 | Milford et al. | 382/208 |
| 3,641,495 | 2/1972 | Kiji | 382/227 |
| 3,818,446 | 6/1974 | Benson | 382/139 |
| 4,032,887 | * 6/1977 | Roberts | 382/318 |
| 4,143,356 | * 3/1979 | Nally | 382/130 |
| 4,148,010 | * 4/1979 | Shiau | 382/139 |
| 4,245,211 | * 1/1981 | Kao | 382/139 |
| 4,315,246 | 2/1982 | Milford | 382/140 |
| 4,399,553 | * 8/1983 | Toyama | 382/139 |
| 4,547,899 | 10/1985 | Nally et al. | 382/139 |
| 4,827,531 | * 5/1989 | Milford | 382/137 |
| 5,026,974 | 6/1991 | Franklin et al. | 235/449 |
| 5,257,319 | 10/1993 | Canu et al. | 382/139 |

* cited by examiner

*Primary Examiner*—Wenpeng Chen
(74) *Attorney, Agent, or Firm*—Kenneth R. Glaser; Michael E. Martin

(57) ABSTRACT

A method and system for recognizing a time varying waveform signal subject to amplitude distortions such as experienced with optical or magnetic printed character reading systems for scanning documents such as bank checks and the like. The variable amplitude waveform is sampled at predetermined time intervals representing predetermined spacings across a dimension of the character being read and difference values related to the sample amplitude ratio values between adjacent samples are calculated to develop a difference waveform or signature. This difference waveform may then be compared to a set of templates representing characters expected to be recognized. The amplitude ratio value of each sample may also be compared to that of a previous sample to determine the direction of the slope of the waveform at selected points wherein rising, falling or no change slope direction identifiers may be compared to a set of templates of characters expected to be read. The method eliminates incorrect character reads resulting from signal amplitude distortions due to system electrical circuit characteristics, various printing methods and other anomalies which tend to distort signals generated by optical or magnetic reading devices.

10 Claims, 3 Drawing Sheets

|  | | SAMPLE | | | | | | | |
|---|---|---|---|---|---|---|---|---|---|
| CHARACTER | 1 | 2 | 3 | 4 | 5 | 6 | 7 | 8 | 9 |
| 0 | - | R | F | N | N | N | N | R | F |
| 1 | - | R | N | R | F | F | N | N | N |
| 2 | - | R | F | N | R | F | N | N | N |
| 3 | - | R | R | F | N | N | F | N | N |
| 4 | - | R | N | F | N | R | N | F | N |
| 5 | - | R | F | N | N | R | F | N | N |
| 6 | - | R | F | R | F | N | R | F | N |
| 7 | - | R | F | R | F | R | F | N | N |
| 8 | - | R | R | F | N | N | R | F | F |
| 9 | - | R | F | F | N | N | R | F | N |

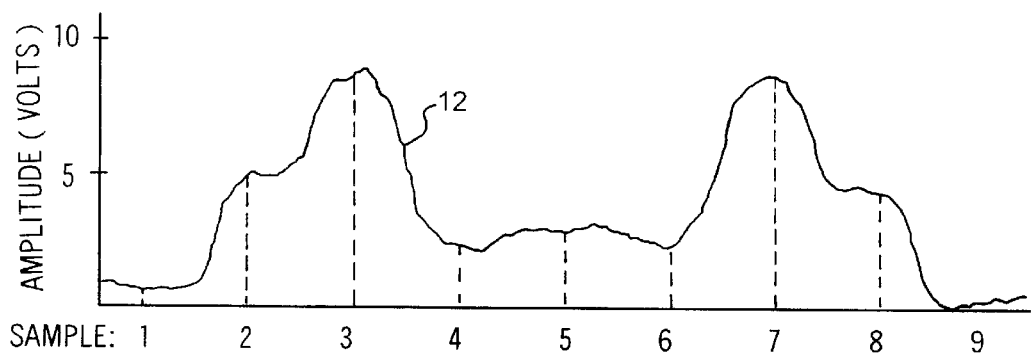
FIG. 3A
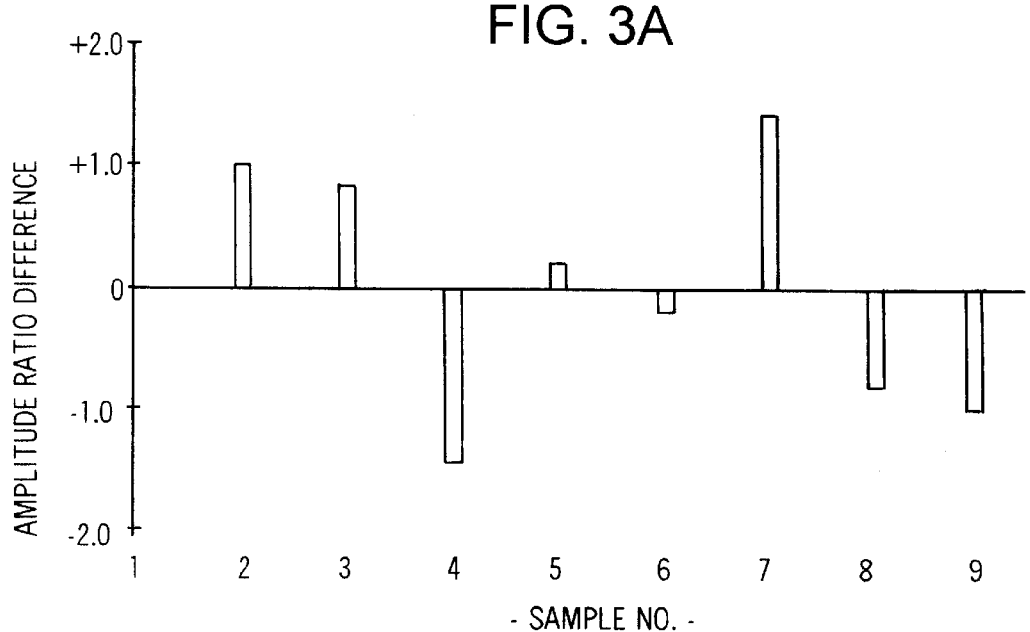
FIG. 3B
| SAMPLE NO. | 1 | 2 | 3 | 4 | 5 | 6 | 7 | 8 | 9 |
|---|---|---|---|---|---|---|---|---|---|
| SIGNAL MAGNITUDE | 0 | 5 | 9 | 2 | 3 | 2 | 9 | 5 | 0 |
| SIGNAL AMPLITUDE RATIO | 0 | 1.14 | 2.06 | .46 | .69 | .46 | 2.06 | 1.14 | 0 |
| RATIO DIFFERENCE | 0 | 1.14 | .92 | -1.60 | .23 | -.23 | 1.60 | -.92 | -1.14 |
| UPPER LIMIT OF RATIO DIFFERENCE (+50%) | 0 | 1.71 | 1.38 | -2.40 | .35 | -.35 | 2.40 | -1.38 | -1.71 |
| LOWER LIMIT OF RATIO DIFFERENCE (-50.%) | 0 | .57 | .46 | -.80 | .12 | -.12 | .80 | .46 | -.57 |
| SAMPLE ACCEPTANCE |  | Y | Y | Y | Y | Y | Y | Y | Y |
FIG. 3C

CHARACTER RECOGNITION METHOD

FIELD OF THE INVENTION

The present invention pertains to a recognition method for printed characters on documents and the like wherein an electrical signal from a character reading device is analyzed on an amplitude versus time basis by sampling the signal waveform at selected intervals and comparing sets of values representing ratios of amplitude direction or slope, or comparing sets of values of differences of amplitude ratios with predetermined recognition templates for characters expected to be read.

BACKGROUND

Several methods and systems have been developed for automatically reading printed characters on documents for document processing and record purposes. For example, in processing bank checks through the banking system, standards for check identification characters have been well established and systems and methods have been developed for optically or magnetically scanning the printed characters on the document for identifying the characters and recording the identified information for various purposes. The banking system, for example, has developed a standard for printed characters known as E13B wherein the characters are printed with ink which may be magnetized and then read by a magnetic flux sensor. Alternatively, the characters may be printed with sufficient contrast with respect to the document background to enable optical scanning.

Magnetically scannable characters, as well as optically scannable characters, often have imperfections which cause the reading devices to produce signal defects. Check documents, for example, have historically been printed by offset, lithographic or ribbon film techniques, each of which produces occasional defects in the printed character which interfere with the recognition process. These character defects show up in the analog waveform signal which is generated by the character reading device. Defects such as the overall waveform amplitude, shift of signal peaks and extraneous secondary signal peaks are sometimes generated. These defects interfere with the character recognition method wherein the scanned waveform is compared with a set of templates which represent all of the possible characters being read on the document.

Although certain adjustments have been made to character template sets in automatic character recognition systems to accommodate signal defects due to various printing techniques, additional printing methods and equipment or system peculiarities have created new signal defect problems in prior art character reading systems and methods. For example, in recent years the use of electrostatic printing techniques using so-called toner print mediums have caused character recognition signal defects including waveform peaks that have greater distortion in relation to other peaks in the character in both magnitude and position, the tendency of the waveform to gradually fall to the signal base line as compared to a rapid signal fall off even though the character has passed the scanning head, and weaker initial waveform peaks which are crucial to the determination of the initiation of reading a character.

Various techniques have been developed in the art of optical and magnetic character recognition. For example, techniques have been developed for reading the amplitude versus time analog signal of a character reading device wherein sampling of the signal polarity versus time at selected intervals across the width of the character forms a set of polarity values which may be compared to a template. Systems and methods have been developed where a time based amplitude signal is sampled at several selected time intervals, the total of which corresponds to the width of the character, the analog signal is converted to a set of binary characters and then compared to binary character sets corresponding to the characters expected to be read.

More recently, methods have been developed wherein the "volume" of ink within sections of the character has been measured and compared to predetermined ink volume character sets for character identification. In this regard, the amplitude of an electrical analog signal generated by the reading device represents the "volume" of ink of the height of the character under the scanning aperture. Typically, the input signal from the magnetic or optical reading device or "head" is amplified and converted from an analog waveform to a series of digital words at periodic intervals across the character. The series of digital words, representing the full character width, are summed to create an average and each individual word is divided by the average to generate a new digital word that represents the ratio of the individual digital words to the average. These ratios are then sequentially matched against a set of character templates for recognition purposes. Typically, the templates consist of a series of ratio ranges for each of the samples in the character series. Each ratio of the series is compared to the template ranges for each character. If all of the ratios are within the template range for a given character, that character is then recognized.

Typically, the template ranges are designed so that all characters have at least one template point that is mutually exclusive from all the other characters to prevent two characters from being simultaneously recognized as one or the other. However, the above described technique is based on measuring signal amplitude at each measurement point and then compared to an average signal amplitude across the width of the character. This technique is thus subject to certain reading errors when reading characters printed according to methods which tend to generate signals of greater or distorted amplitudes across the character width.

The following references have been identified as representing the state of the art in magnetic or optical character recognition methods, including those discussed hereinabove.

| Patent No. | Inventor | Issue Date |
| --- | --- | --- |
| 3,114,131 | R. J. Furr et al. | 12/10/63 |
| 3,264,609 | K. Scheidhauer | 08/02/66 |
| 3,391,387 | I. Flores | 07/02/68 |
| 3,439,337 | C. B. Trimble | 04/15/69 |
| 3,528,058 | M. F. Bond | 09/08/70 |
| 3,571,793 | R. H. Britt | 03/23/71 |
| 3,629,829 | R. Ordower | 12/12/71 |
| 3,638,238 | R. E. Milford et al. | O1/25/72 |
| 3,641,495 | K. Kiji | 02/08/72 |
| 3,818,446 | D. A. Benson | 06/18/74 |
| 4,032,887 | D. C. Roberts | 06/28/77 |
| 4,245,211 | C. T. Kao | 01/13/81 |
| 4,315,246 | R. E. Milford | 02/09/82 |
| 4,547,899 | R. B. Nally et al. | 10/15/85 |
| 4,827,531 | R. E. Milford | 05/02/89 |
| 5,026,974 | G. R. Franklin et al. | 06/25/91 |
| 5,257,319 | Canu et al. | 10/26/93 |

Contrary to the systems and methods represented by the above-cited references, the present invention is directed to a character recognition system and method which overcomes some of the problems associated with variations in magnetic ink consistency, interaction of the magnetized or contrasted character with the reading device and its associated circuitry and certain printing techniques including those which use electrostatic toner type ink materials which cause signal amplitude distortions.

SUMMARY OF THE INVENTION

The present invention provides an improved method for recognizing printed characters on a document or the like by treating an amplitude versus time representation of a signal generated by a character reading device in a manner which overcomes certain signal defects caused by printing methods and certain anomalies of the reading device and associated circuitry.

In accordance with one aspect of the present invention, a character reading method is provided wherein an amplitude versus time analog signal or waveform representing each character is measured at selected time intervals across the width of the character and the signal values at the sampling intervals are subjected to unique analysis and compared to a set of templates representing all of the characters expected to be read by the reading system.

In one embodiment of the invention, amplitude waveform is measured or sampled at selected time intervals, a set of amplitude magnitude values is averaged, each sample of the set is divided by the average for the set to provide a set of amplitude ratio values. The magnitude of the amplitude ratio of each sample is compared to the amplitude ratio of a previous sample to determine slope, that is whether the last measured sample is greater in magnitude or less in magnitude than the previous measured sample. A set of amplitude ratio values having either rising or falling or no change slope characteristics is then compared to the template set to identify the character which has been read.

In another embodiment of the invention, the difference in magnitude between one sample amplitude ratio value and the next sample amplitude ratio is determined to generate a so-called difference waveform which may also be compared to a set of templates of difference waveforms representing the characters expected to be read. Still further, the differences between magnitudes of samples at the selected measurement points may be compared directly using the actual waveform amplitude values to determine the difference waveform of all of the measurement points and compared with a set of templates of predetermined limits of these difference values to identify a character.

Accordingly, characters which produce waveforms generated by a reading device which have correct geometric patterns or shapes but which have distorted waveform amplitudes or peaks may still be recognized. For example, each character will have a unique time versus amplitude direction change of its analog waveform. By determining both positive and negative signal amplitude changes which exceed a predetermined threshold amplitude and comparing amplitude ratio values for each sample or by determining the unique difference signature of a character, indicative of the direction and amplitude of the signal change with respect to a previous signal sample, more accurate character recognition may be obtained for characters which have been produced by different printing methods. The method of the invention overcomes deficiencies of prior art methods with respect to changes in signal amplitude resulting from different character printing methods and other signal distortions generated within certain character reading and signal processing apparatus.

Those skilled in the art will further appreciate the above-mentioned features and advantages of the invention together with other superior aspects thereof upon reading the detailed description which follows in conjunction with the drawing.

BRIEF DESCRIPTION OF THE DRAWING

FIG. 3A is a diagram similar to FIG. 1 showing the sampling intervals in accordance with a second preferred embodiment of the method of the invention;

FIG. 3B is a diagram showing the signal amplitude ratio difference magnitudes for successive sample points of the diagram of FIG. 3A;

FIG. 3C is a table showing the signal measurement parameters for the exemplary character whose signal characteristic is illustrated in FIGS. 3A and 3B;

DESCRIPTION OF THE PREFERRED EMBODIMENTS

Figures 1, 2:
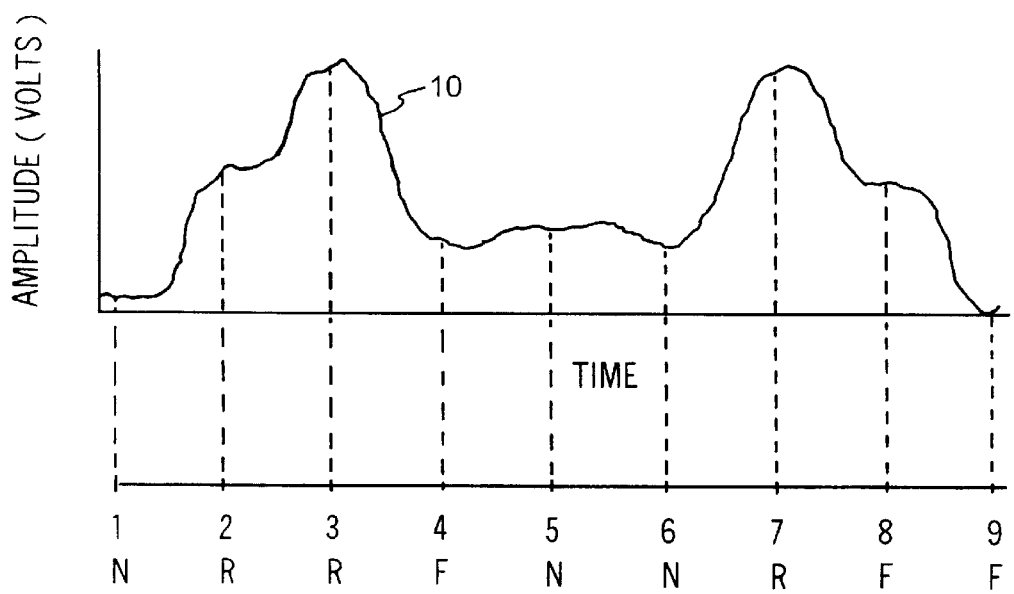
FIG. 1 is a diagram showing an amplitude versus time analog signal for a numeral 8 printed in accordance with the E13B magnetic character recognition standard.
FIG. 2 is a table illustrating rising or falling slope characteristics of E13B characters representing numerals 0 through 9 in accordance with a first preferred embodiment of the method of the invention.

In the description which follows like elements are designated throughout the specification and drawing with the same terms and reference numerals, respectively. The drawing figures are not intended to be to scale and certain elements which are known to those skilled in the art are shown in generalized or schematic form in the interest of clarity and conciseness.

Several systems have been developed for optically or magnetically scanning printed characters on documents and identifying those characters for information retrieval and document processing purposes. In the banking industry, for example, bank checks have a series of printed characters disposed along the lower front face of the check which are printed in a prescribed font to enable character recognition and processing systems to properly identify the check by the paying bank and account number, for example. The United States banking system has adopted a standard for printed check identification characters known as E13B. These characters are printed with an ink which may be magnetized by a device known as a "write head" and subsequently, at a known velocity, passed by a sensor or so-called "read head" which responds to the magnetic intensity of the characters to generate an electrical signal which has a certain shape, as a function of time and character shape, which may then be compared with idealized signals associated with each character shape to identify the character. Systems currently in use are operable to convert the analog electrical signal generated by the read head to digitized signals which may be manipulated rapidly by certain digital signal processing devices and with substantial accuracy.

FIG. 1 is a diagram showing signal amplitude versus time for a typical printed character, printed in accordance with the E13B standard and representing the numeral 8. FIG. 1 is merely exemplary of the character signals which may be generated by a conventional magnetic or optical reading device which may be used in connection with the method of the invention. The amplitude versus time signal illustrated in FIG. 1, represents the "signature" of the numeral 8, and each character has a unique "signature" due to its unique shape. The printed shape and volume of ink representing a particular character as it passes the reading device results in the change in signal amplitude associated with the shape of the character. If a document is passed by the reading device at a predetermined constant velocity, the time scale (abscissa of FIG. 1) represents the width of the character and the peaks represent changes in the amount of magnetic material, properly filtered, under the read head. Changes in signal amplitude caused by different printing techniques as described above may affect the character recognition process. Certain anomalies in the character reading device and signal amplification circuitry may also affect signal amplitude value. Accordingly, prior art methods of measuring the signature of a particular character by measuring the signal amplitude pattern may produce reading errors.

One preferred method of overcoming the defects in prior methods of measuring the signal versus time characteristic is determining the direction of the so-called slope of the signal from one sample point to another over a selected number of samples of the signal across the time or width scale of the character. As shown in FIG. 1, for example, the variable amplitude waveform 10 representing the signature of an E13B numeral 8 may be measured at selected intervals across the width of the character (the time scale in FIG. 1) and the magnitude of the signal at a selected sampling point may be compared to the magnitude of the signal at a previous sampling point to determine whether it is of greater or lesser magnitude. For example, the signal magnitude may be sampled at sampling positions 1 through 9, as indicated in FIG. 1, and the magnitude of sample 2, for example, may be compared with the magnitude of sample 1. Since the magnitude of sample 2 is greater it is indicated that the slope of the signal is positive or rising at sample 2. The magnitude of the signal waveform 10, as measured at sample 3, is also greater than as measured at sample 2 indicating that the slope of the signal characteristic 10 is still rising at sample point 3. However, the signal magnitude measured at sample point 4 is less than the signal magnitude measured at sample point 3 indicating the direction of slope is negative or falling at point 4 with respect to sample point 3.

As shown in FIG. 1, sample point 5 is indicated to have a magnitude which is not materially different from the magnitude of the signal at sample point 4 and thus this comparison indicates that, at sample point 5, there is no change (N). Sample points 6, 7 and 8 also, when compared to the previous sample points, show no change (N), rising signal magnitude or slope (R) and negative or falling slope (F), respectively, as shown. Accordingly, the signal waveform 10 may be measured at selected intervals, as indicated in FIG. 1, and the sample magnitude compared to the previous sample point so that a pattern of rising and falling (or no change) signal magnitudes may be established for each character. If a predetermined number of samples is determined to be sufficient to identify each different character expected to be read, then each character may be read without concern for the actual waveform amplitude values, which may be distorted, as discussed above, as a result of the printing process or certain anomalies in the character reading equipment.

Referring to FIG. 2, there is shown a table of E13B characters zero through nine and their respective sample slope characteristics. Clearly, each character has a unique sample "signature" of rising, falling or no change features with respect to the slope of the analog waveform signal, such as indicated in FIG. 1. The "R", "F", or "N" value of sample number one is irrelevant since it is not compared to a previous sample. Initialization of a character reading step may occur when the reading device senses a predetermined change in the signal amplitude. Moreover, predetermined threshold values of sample amplitudes or change in amplitude of the signal may be designated and which will avoid reading what is thought to be a character when less than a predetermined analog signal value is generated by the read head 12 and its amplification system, if any.

Improvements in the quality of the character recognition method can, however, be realized in accordance with this invention by comparing sets of values of amplitude ratios with templates of values of amplitude ratios for each character to be recognized. Accordingly, it is preferable that a so-called signature waveform be developed by taking a set of samples of waveform amplitude values across the width of the character, as indicated for the diagram of FIG. 1 and the previous discussion, and then for each sample dividing the sample magnitude value by the average for all of the sample magnitude values of the set. Accordingly, each set of samples is summed and divided by the number of samples to establish an average value of sample magnitude and this value is then divided into the value of each sample of a character set to provide a set of amplitude ratio values. The ratio value of each sample is then compared to the ratio value of the previous sample to determine whether the difference is positive or negative, thereby indicating the change in direction of slope of the waveform which represents all of the amplitude ratio values of a set. The amplitude ratio waveform has the same general shape or "signature" as the waveform 10 illustrated in FIG. 1. Since only changes in the slope of the signal generated by a particular character are measured in accordance with the foregoing description, actual signal amplitude values are not subject to erroneous readings.

The method of comparing sets of change-in-direction of slope of amplitude ratio values is also carried out by sampling a large number of amplitude values, determining corresponding amplitude ratio values and determining a set of direction of slope indicators. For example, a total of 72 waveform amplitude samples may be taken over the width of a character and these values grouped in eight sets of samples, each set having nine actual measured amplitude values. Each set is then compared to the templates and the best correlation between a sample set and the template is used in the comparison. This technique minimizes the problem of detecting the start of a character waveform.

Still further, the recognition characteristics for this embodiment of the method can be altered by changing the threshold value of signal amplitude change that is required for the next sample to be considered a rising or falling slope change. Moreover, the threshold value for rising and falling slope signals may be different.

Those skilled in the art will recognize that the above-described method of character recognition does not consider the actual amplitude of the sampled signal and thus "raw" signal analysis is not subject to errors due to changes or distortions in signal amplitude. Moreover, the method is not required to consider the polarity of the signal waveform. In particular, by sampling only the raw signal data in a digitized form, the signal processing equipment required for carrying out the method is less expensive than that required for certain other techniques used to identify printed characters and the like. The above-described embodiment of the method may be carried out by digital signal processing equipment suitably programmed to digitize the analog signal represented in FIG. 1 and generating a digital word that represents the absolute signal amplitude at the sample position or the ratio of the signal amplitude to the average of all signal amplitudes for a sample set. The created digital word is then placed in a register so that it can be compared to the next input digital word. For every comparison, the register would hold the previous input word. The digital word being held in the aforementioned register is then compared with a new word received from the digital signal processing circuitry. If the new word is greater than the register value by a preset threshold value, a signal output from a slope detector circuit would then indicate a rising signal amplitude or edge. If the register value is greater than the new input word by at least the predetermined threshold value, an output signal from the slope direction detector circuit would indicate a falling signal amplitude or edge. If the difference between the register value and the input word is less than the slope threshold then, of course, the slope detector would indicate no change.

Figures 4, 5:
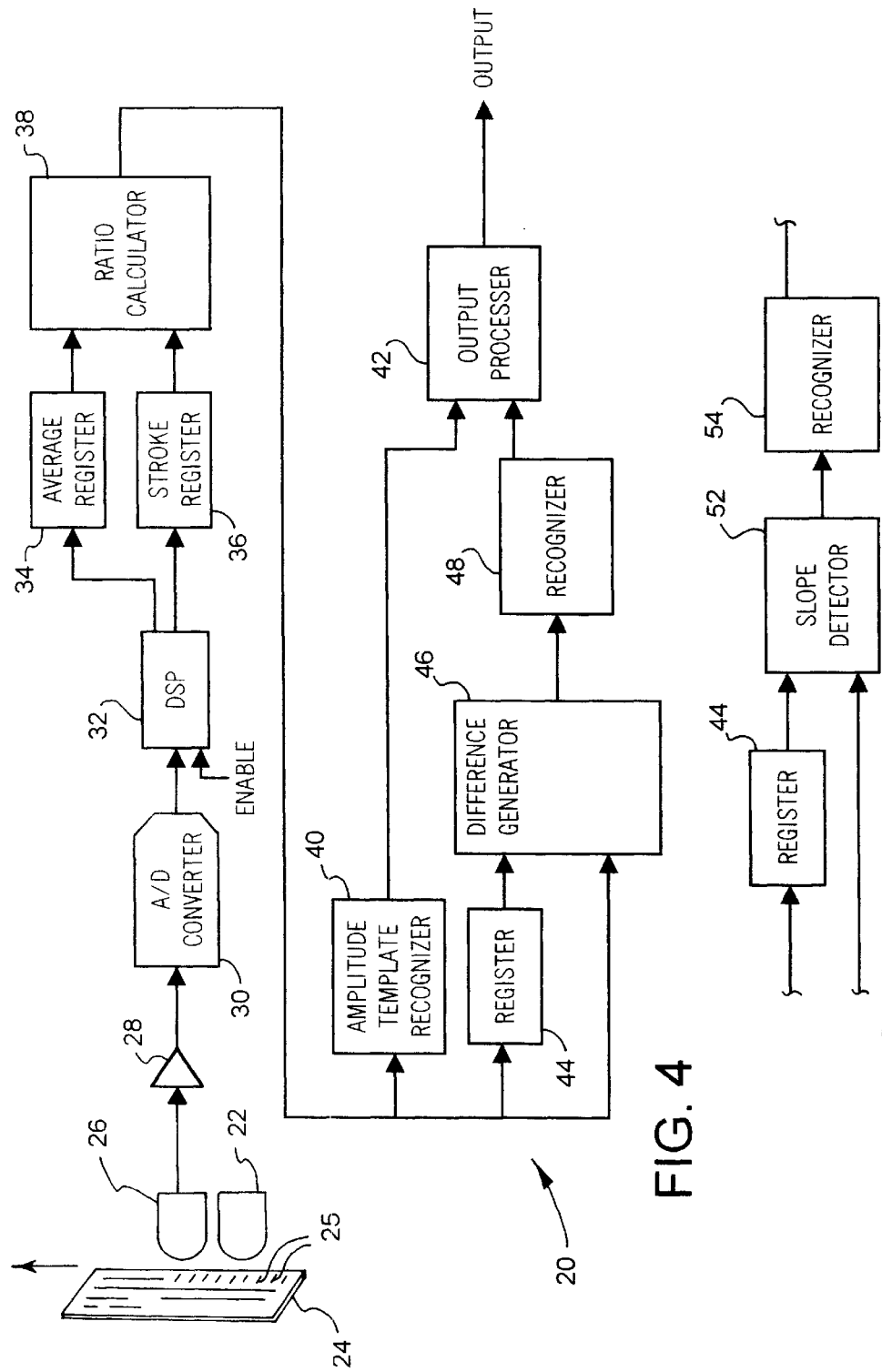
FIG. 4 is a block diagram of a character reading system which may be used in conjunction with the second preferred method of the invention.
FIG. 5 is a partial block diagram showing certain features of the system of FIG. 4 as modified to carry out the first preferred method of the invention.

The slope detector output signal is a set of samples which may be imposed on a recognizer circuit which would compare the output of the slope detector to the slope signature of each valid character in the recognizer circuit. If the slope directions of all samples matches the slope signature for a character, that character is recognized and a unique code representing that character is output to further circuitry for processing or for archival purposes. Each valid character has a unique output code. A basic block diagram illustrating a system for processing data representing the aforementioned method is illustrated in FIGS. 4 and 5 and is described in some further detail hereinbelow.

Another preferred method in accordance with the present invention is operable to sample the analog waveform of a character read by one of the aforementioned reading devices and also perform analysis steps which generates a "signature" which is also identifiable even with major distortions in signal amplitude caused by one or more of the aforementioned defects. FIG. 3A illustrates the analog signal amplitude versus time waveform 12 of the E13B numeral 8, by way of example, wherein a sampling technique is carried out which samples the waveform amplitude at nine sampling points, equally spaced over the width of the character (which corresponds to the abscissa scale). In the second preferred method, signal magnitude measurement involves the steps of taking a large number of individual samples, say 72, for example, equally spaced across the width of the character and dividing these samples into eight sets of nine samples each, the nine samples representing a set also are averaged and the individual samples of each set are divided by the average to provide a set of amplitude ratio values.

Referring now to FIG. 3B, there is illustrated a diagram indicating the amplitude ratio difference values for a set of nine samples of waveform amplitude corresponding to the waveform of FIG. 3A. In accordance with the method associated with the diagrams of FIGS. 3B and 3C, the differences between the amplitude ratios of each sample with respect to the previous sample are determined to develop a character signature. Referring to FIGS. 3B and 3C, for example, sample number one has a signal magnitude of zero, a signal amplitude ratio of zero and since this amplitude ratio cannot be compared with a previous amplitude ratio, it has a ratio difference of zero also. However, sample number two has an absolute magnitude of five but an amplitude ratio of 1.14 and thus a ratio difference when compared to the previous sample of 1.14. Still further, sample number three has an absolute amplitude value of nine, an amplitude ratio value of 2.06 and a ratio difference value, when compared with the amplitude ratio value of sample number two, of 0.92. In this way, the amplitude ratio value of each sample may be compared with the amplitude ratio value of the previous sample of the set to develop a set of ratio difference values as indicated by the diagram of FIG. 3B and as listed in the table of FIG. 3C. These values have a particular signature or identity for each character expected to be read.

From prior experience with a particular character reading system, upper and lower limits of the ratio difference values may be established to indicate whether or not a ratio difference value of a sample is acceptable or not acceptable. For the exemplary E13B numeral 8 character upper and lower ratio difference values of plus fifty percent and minus fifty percent are indicated. If a ratio difference value falls within the upper and lower limits, then a sample may be accepted as indicated in FIG. 3C. The method may be adapted to accept a sample set for comparison if a predetermined number of acceptances are obtained. For a particular character, one or more samples may tend to fall outside the ratio difference limit values established and thus the character may be accepted even though one or more ratio difference values fall outside of the acceptance limits.

Accordingly, by determining a set of difference magnitudes of the amplitude ratio values for a set of samples a so-called ratio difference "waveform" may be established which is unique to each character expected to be recognized. As previously discussed, the use of the amplitude ratio values has the effect of normalizing the actual amplitude values of the analog signals which can be in excess of anywhere from fifty percent to two hundred percent of the amplitude values of a standard character. By using the amplitude ratio values and the differences in the amplitude ratio values a character set can be recognized and accepted even though its signal amplitude is significantly distorted.

The methods described above in conjunction with FIGS. 1, 2 and 3A through 3C may be implemented on a system having components illustrated in FIG. 4. Referring to FIG. 4, a block diagram of a system for reading a document and performing the methods described above is illustrated and generally designated by the numeral 20. The system 20 includes a so-called writing head 22 which is disposed in proximity to the transport path for a document 24 to be read by the system 20. The writing head 22 may be of a type known in the art of printed character reading systems and is operable to saturate the ink of a series of characters 25 on document 24 with sufficient magnetic flux so that all previous magnetization of the ink is erased and a remnant magnetic field of known polarity is impressed in the ink of the characters within the area of the document to be scanned.

The system 20 further includes a reading head 26 which may be of a type known in the art and which is responsive to the document characters passing in proximity thereto to sense the magnetic field generated by each character and produce an analog output voltage signal such as that illustrated in FIGS. 1 and 3A. Such signals are a function of the shape of the character being scanned and the filtering being applied by amplifier 28. A scanning head, not shown, which responds to reflected or transmitted light and produces a time varying analog signal could also be used in the system 20 in place of the magnetic devices 22 and 26.

The character reading head 26 is operably connected to a preamplifier and integrator circuit 28 which amplifies the analog signal from the device 26, applies filtering and integration to shape the waveform and eliminates spurious noise, such as 60 Hz electrical interference and signals generated by minor printing defects. The circuit 28 is operably connected to an A/D converter circuit 30 which samples the analog voltage input and produces a digital word that represents the amplitude of the analog waveform at the sample point. The sampling rate is seventy-two times per character. Each digital word produced by the A/D converter 30 is transmitted to a suitable digital processing circuit 32 which may be a suitably programmed microprocessor that performs the following functions.

The processor 32 senses an enable signal that assures that a document is present at the reading device 26 and that sufficient space has occurred since recognizing the previous character. The processor 32 also serves as a buffer for all of the sample words for each character received from the converter 30. The processor 32 also detects the start of a character being read by sensing successive increasing signals over a predetermined threshold signal value. If the average signal level for the entire character exceeds a predetermined threshold signal value, the processor 32 is enabled to perform the following function.

The processor 32 may be operated to select one or up to eight sets of equally spaced samples or "strokes" across the width of the character with each set having, respectively, nine samples or strokes. Each set of samples representing a possible best match for subsequent recognition of the character is then analyzed for identification. The average amplitude value is computed for each set, using each sample of the character set. Each set, if plural sets are to be analyzed, is displaced from its adjacent set by one sample signal. For example, samples 1, 9, 17, 25, 33, 41, 49, 57 and 64 represent the first set and samples 2, 10, 18, 26, 34, 42, 50, 58 and 65 represent the second set and so on until the sets are formed utilizing all of the 72 character samples. The average of all of the samples in a set is computed for all sets of the character.

The average value for each set described above is then transmitted to an average register 34 and each sample is transmitted to a sample register 36. The registers 34 and 36 drive a ratio calculator circuit 38 comprising an erasable programmable memory (EPROM) that "divides" each sample by its associated average and forms an amplitude ratio value.

The system 20 further includes an amplitude template recognizer 40 operably connected to the circuit 38 and, according to a method described in U.S. Pat. No. 4,827,531 to Milford, identifies the unknown character read by the system 20 by matching the amplitude ratios of each character with a set of templates of amplitude ratios representing all of the characters expected to be read by the system 20. If there is a suitable match of a signal input to the recognizer circuit 40 with a character template stored therein the resulting identification is transmitted to a processing circuit 42 where a final character determination or identification is made.

The system 20 is operable to take the output signals from circuit 38 through a parallel processing path which includes a register 44 which holds the digital input word so that it can be compared to the next input word. For every comparison, the register 44 holds the previous input word. The system 20 includes a difference generator circuit 46 which is capable of generating an output signal which represents the numerical difference between two successive input words. The output signal from the difference generator 46 also indicates whether the amplitude change was positive or negative. The output signals from the difference generator 46 represent the ratio difference values described above in conjunction with FIGS. 3A through 3C. These signals are transmitted to a recognizer circuit 48 which compares the output signals from the difference generator 46 against a set of templates stored in the recognizer for all valid characters expected to be read by the system 20.

If a character is identified by the recognizer circuit 48, a suitable signal is transmitted to the output processor 42. The output processor 42 is a digital signal processor circuit that stores all of the characters identified from each set of signals from both the amplitude template recognizer 40 and the recognizer circuit 48. Depending on the type of printing, identified previously, for a document being scanned, the system may be biased to indicate which recognizer is more reliable for a particular character. If there is a difference in the character identified by the parallel identification circuits as received by the processor circuit 42 the processor circuit may be programmed to make a decision based on an algorithm that is modifiable with processing experience to favor which of the recognizer circuits is more reliable. Since the first or second sets of signals are more likely to be the best match between the respective sets and a character template, those sets are usually given preference over later sets. As a set sequence progresses across the character, it is more likely that a misread will occur.

Referring now to FIG. 5, there is illustrated a partial block diagram of a modification of the system illustrated in FIG. 4 wherein the difference generator 46 and recognizer 48 are replaced by a slope direction detector circuit 52 and a recognizer circuit 54. Accordingly, the signals from the ratio calculator 38 may be input to the register 44 and the slope direction detector 52 and the output signal of the recognizer 54 may be transmitted to the output processor 42 of the circuit of FIG. 4. Alternatively, the circuits shown could be modified to input signals from the register 36 to register 44. The slope direction detector 52 compares the digital word in the register 44 to a new input word from the ratio calculator circuit 38. If the input word is greater than the word stored in the register 44 by at least the predetermined slope threshold value, the output of the slope detector will indicate a rising edge (R). If the register value is greater than the input word by at least the predetermined threshold value, the slope detector will output a signal indicating a falling edge (F). If the difference between the register value and the input word is less than the predetermined threshold value, then the slope detector 52 will output a signal to the recognizer 54 indicating no change (N).

The output signals from the slope direction detector 52 are then compared to the slope direction signature of each valid character whose template is stored in the recognizer circuit. If the slope of all samples, for example, matches the slope direction signature for a character, then that character is recognized and a suitable code representing that character is output to the processor 42.

The above-described slope direction recognition and ratio difference waveform recognition methods can be used independently of a system which compares the output character recognition of one or the other of these methods with a signal amplitude character recognition according to the method as described in the above-mentioned prior patent. The digital words representing the stroke or sample values generated by the processor 32 may also be presented directly to the register 44 and the difference generator 46 wherein actual difference values of the sample amplitude values may be used as the recognition "waveform".

Still further, it is contemplated that the methods of the invention may be applied to requirements for recognizing wave shapes of other analog signals when masked against or compared with a set of templates of predetermined signal wave shapes. Moreover, it is believed that the methods and system as described above may be carried out by one of skill in the art of printed character recognition methods and systems based on the foregoing description.

Although preferred embodiments of the method of the invention, as well as a system for carrying out the methods, have been described in some detail, those skilled in the art will also recognize that various substitutions and modifications may be made without departing from the scope and spirit of the appended claims.

What is claimed is:

1. A method for recognizing one or more characters on a document and the like comprising the steps of:

scanning said document with a device which is operable to generate a signal having a time varying amplitude represented by a waveform which is peculiar to the shape of a character being scanned;

determining the amplitude of said waveform at a predetermined number of positions on a time scale of said waveform, representing one dimension of said character, to provide a set of sample values of the amplitude of said waveform;

calculating the amplitude ratio value of a predetermined number of samples of a set by dividing each sample magnitude by the average magnitude of the predetermined number of samples of the set;

determining the difference between selected ones of said sample amplitude ratio values with respect to an adjacent sample amplitude ratio value to generate a set of ratio difference values; and comparing said set of ratio difference values to predetermined sets of ratio difference values, each of said predetermined sets of ratio difference values representing the identity of a character, to recognize the character being scanned.

2. The method set forth in claim 1 including the step of:

determining the amplitude of said waveform at a further predetermined number of positions on said time scale of said waveform to provide plural sets of sample amplitude ratio values of said waveform;

generating a set of ratio difference values for each of said plural sets of amplitude ratio values; and comparing plural sets of ratio difference values with said predetermined sets of ratio difference values representing the identity of a character.

3. The method set forth in claim 1 including the step of:

comparing the amplitude ratios of each set with predetermined sets of amplitude ratios representing characters expected to be identified on said document to identify which character has been read.

4. The method set forth in claim 3 including the step of:

comparing a character identified by the steps of claim 3 with a character identified by the steps of claim 1 and selecting a recognized character as the character scanned by said device.

5. A method for identifying an event representable by a variable amplitude waveform, comprising the steps of:

generating an analog waveform signal of said event;

determining the amplitude values of said waveform at a predetermined number of positions on said waveform to provide a set of sample values of the amplitude of said waveform;

determining the amplitude ratio of each sample value by dividing each sample value by the average sample value of said set;

determining the numerical difference between the amplitude ratio value of selected ones of said samples with respect to an adjacent sample amplitude ratio value, respectively, to generate a set of ratio difference values; and comparing said set of ratio difference values to predetermined sets of values, each of said predetermined sets of values representing the identity of an event expected to be recognized, to recognize said event.

6. In a system for recognizing printed characters on a document, a reading head operable to scan a character on said document and operable to generate a time varying waveform signal representing a dimension of said character, an amplifier operably connected to said reading head for amplifying said waveform signal, a converter circuit operably connected to said amplifier for converting said waveform signal to a predetermined number of digital words representing sample values of said waveform signal, a processing circuit operably connected to said converter circuit for receiving said digital words representing said sample values and operable to select a predetermined number of sets of equally spaced sample values across said dimension of said character, each set having a predetermined number of sample values, said processing circuit being operable to calculate an average value for each set, an average register operable to receive said average values of each set, a sample register operable to receive the sample values from said processing circuit, a ratio calculator circuit operably connected to said registers for calculating the amplitude ratio of selected sample values to the average amplitude value of said set which includes said selected sample values, a second register operably connected to said ratio calculator circuit for storing a digital input word for comparison to the next input word, said second register being operable to hold a previous input word for each comparison, a difference generator operably connected to said second register for generating a difference value representing the amount of amplitude ratio change of a sample value with respect to an adjacent sample value and a difference recognizer circuit operably connected to said difference generator for comparing a set of amplitude ratio difference values generated by said difference generator to predetermined sets of amplitude ratio difference values representing characters expected to be recognized by said system.

7. The system set forth in claim 6 including:

an amplitude template recognizer circuit connected to said ratio calculator and operable to compare said words representing the ratio of a sample signal amplitude to the average signal amplitude for said set to a set of templates of amplitude ratios representing a predetermined set of characters expected to be recognized by said system; and an output processing circuit operable to compare a coded signal representing a character recognized by said amplitude template recognizer circuit with a coded signal representing a character recognized by said difference recognizer circuit.

8. In a system for recognizing printed characters on a document, a reading head operable to scan a character on said document and to generate a time varying waveform signal representing a dimension of said character, an amplifier operably connected to said reading head for amplifying said waveform signal, a converter circuit operably connected to said amplifier for converting said waveform signal to a predetermined number of digital words representing sample values of said waveform signal, a processing circuit operably connected to said converter circuit for receiving said digital words representing said sample values and operable to select a predetermined number of sets of equally spaced sample values across said dimension of said character, each set having a predetermined number of sample values, said processing circuit being operable to calculate an average value for each set, an average register operable to receive said average values of each set, a sample register operable to receive the sample values from said processing circuit, a ratio calculator circuit operably connected to said registers for calculating the amplitude ratio of selected sample values to the average amplitude value of said set which includes said selected sample values, a second register operably connected to said ratio calculator circuit for storing a digital input word for comparison to the next input word, said second register being operable to hold a previous input word for each comparison, a slope direction detector circuit connected to said second register for generating an identifier indicating whether the direction of slope of said waveform signal is rising, falling or not changing with respect to an adjacent sample value and a slope direction recognizer circuit operably connected to said slope direction detector circuit for comparing a set of identifiers generated by said slope direction detector circuit to predetermined sets of identifiers representing characters expected to be recognized by said system.

9. The system set forth in claim 8 including:

an amplitude template recognizer circuit operably connected to said ratio calculator circuit and operable to compare said words representing the ratio of a sample signal amplitude to the average signal amplitude for said set to a set of templates of amplitude ratios representing a predetermined set of characters expected to be recognized by said system; and an output processing circuit operable to compare a coded signal representing a character recognized by said amplitude template recognizer circuit with a coded signal representing a character recognized by said slope direction recognizer circuit.

10. A method for recognizing one or more characters on a document comprising the steps of:

scanning said document with a device which is operable to generate a signal having a time varying amplitude represented by a waveform which is peculiar to the shape of a character being scanned;

determining the amplitude of said waveform at a predetermined number of positions on a time scale of said waveform, representing one dimension of said character, to provide a set of sample values of the amplitude of said waveform;

calculating the amplitude ratio value of a predetermined number of samples of a set by dividing each sample magnitude by the average magnitude of the predetermined number of samples of the set;

determining the difference between selected ones of said sample amplitude ratio values with respect to an adjacent sample amplitude ratio value to generate a set of ratio difference values;

comparing said set of ratio difference values to predetermined sets of ratio difference values, each of said predetermined sets of ratio difference values representing the identity of a character;

comparing said set of ratio difference values to respective sets of ratio difference values representing upper and lower limits of the magnitude of said ratio difference values for respective characters expected to be read; and identifying a character based on a predetermined number of ratio difference values falling within a range between said upper and lower limits for each set of ratio difference values.

* * * * *